April 16, 1963
L. D. GAVETTE
3,085,798
MULTI-PURPOSE POWERPLANT STAND
Filed Feb. 19, 1959
4 Sheets-Sheet 1
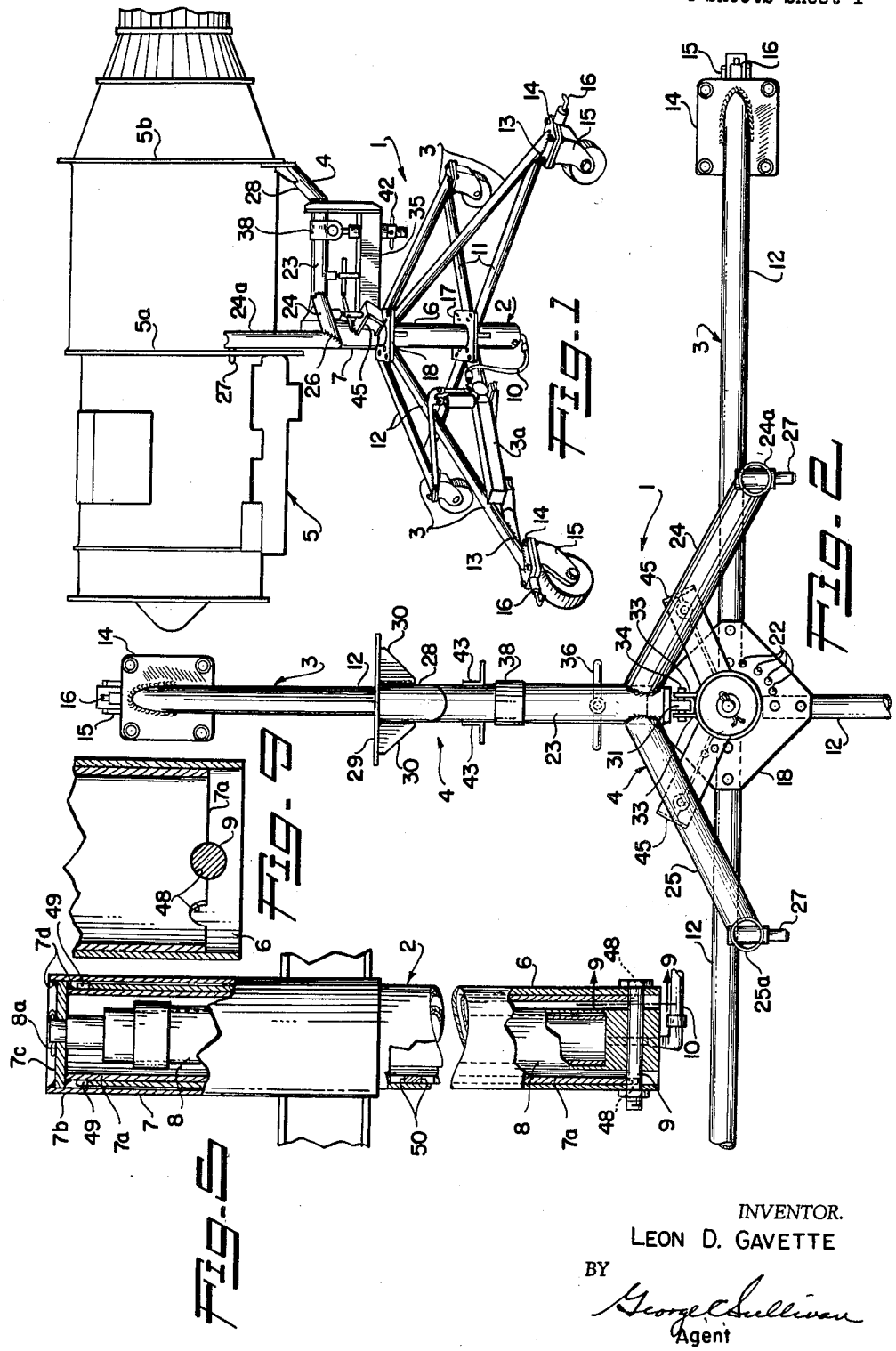
INVENTOR.
LEON D. GAVETTE
BY
George C. Sullivan
Agent April 16, 1963     L. D. GAVETTE     3,085,798
MULTI-PURPOSE POWERPLANT STAND
Filed Feb. 19, 1959     4 Sheets-Sheet 2
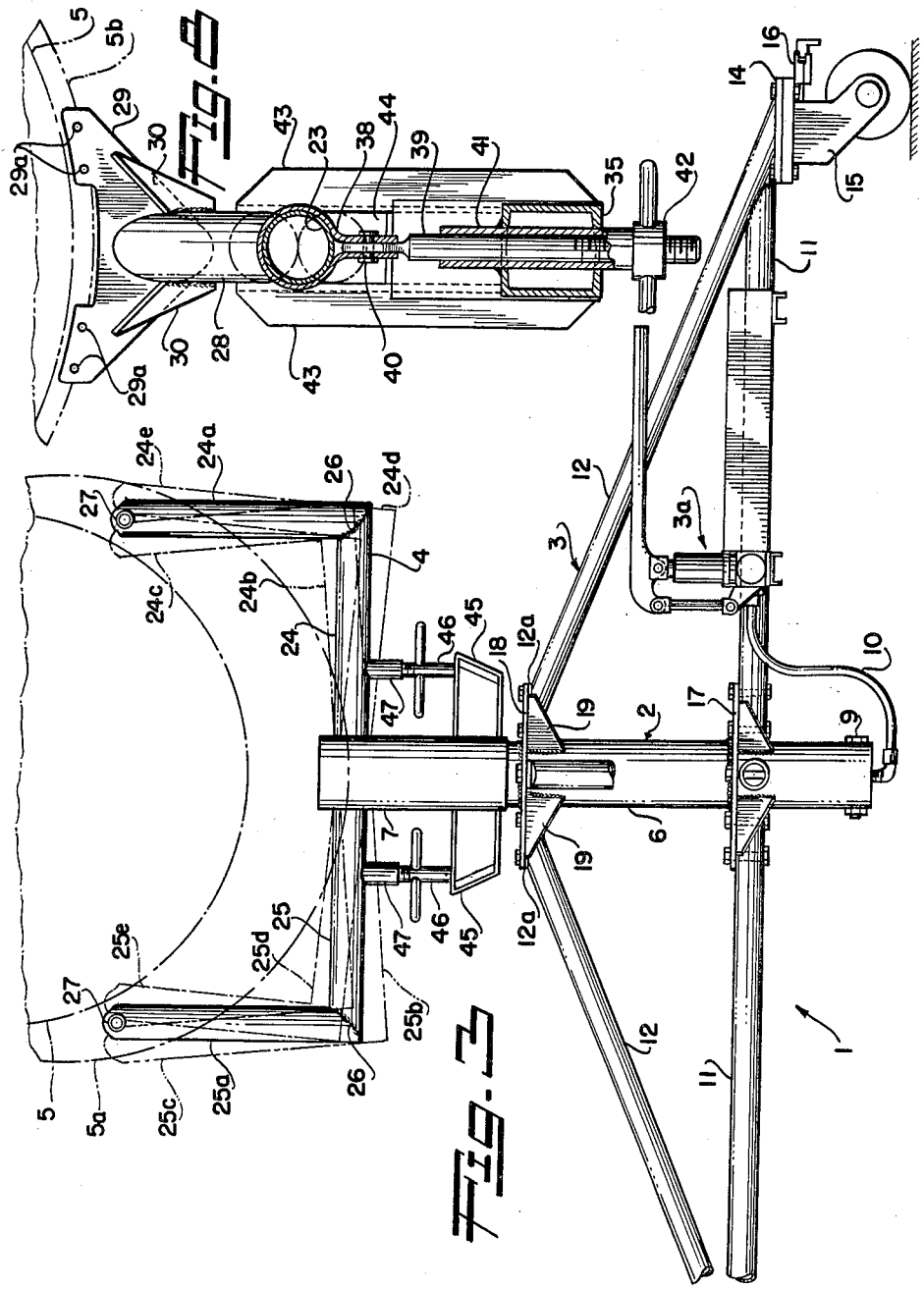
INVENTOR.
LEON D. GAVETTE
BY
*George C. Sullivan*
Agent April 16, 1963
L. D. GAVETTE
3,085,798
MULTI-PURPOSE POWERPLANT STAND
Filed Feb. 19, 1959
4 Sheets-Sheet 3
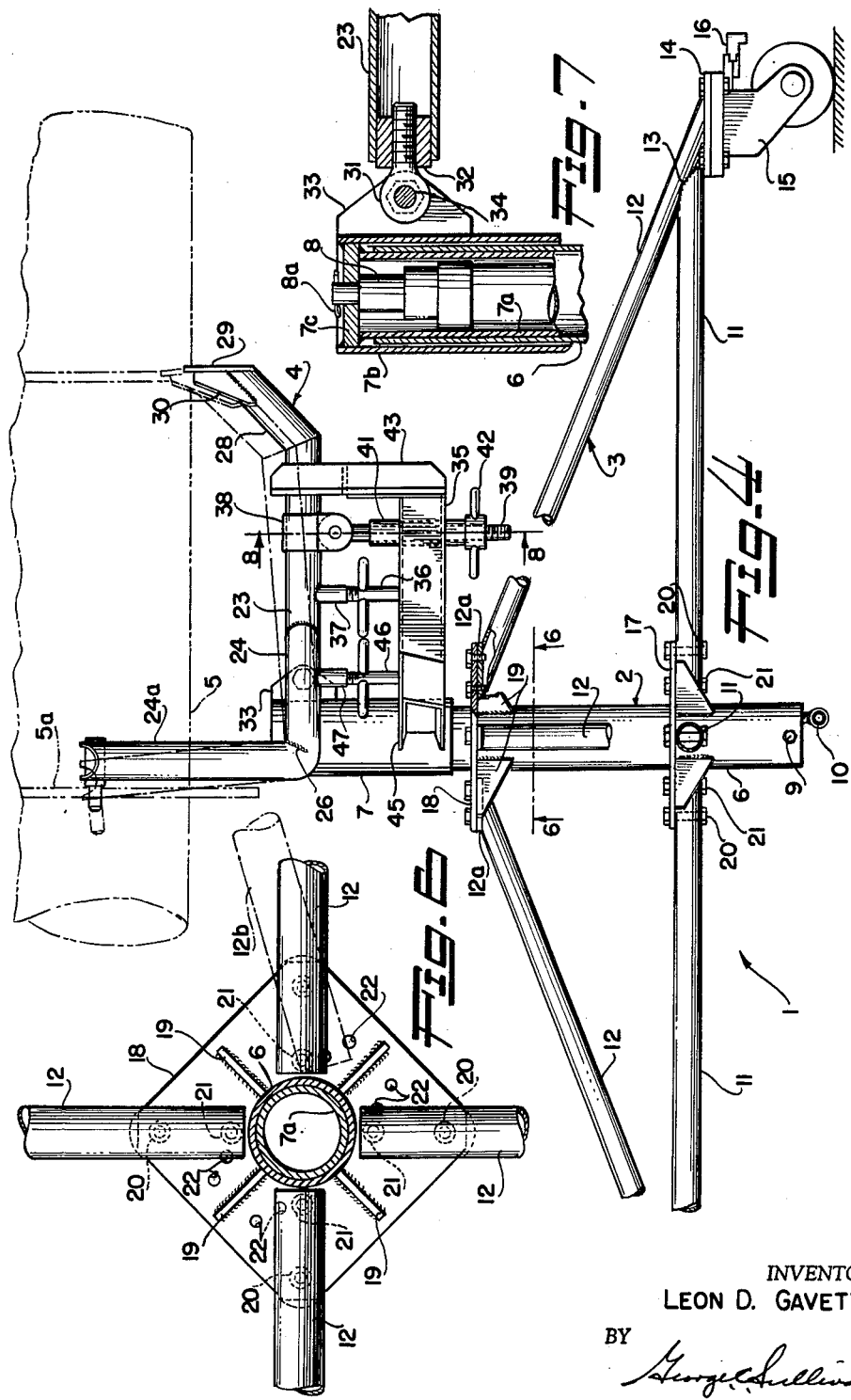
INVENTOR.
LEON D. GAVETTE
BY
*George C. Sullivan*
Agent April 16, 1963
L. D. GAVETTE
3,085,798
MULTI-PURPOSE POWERPLANT STAND
Filed Feb. 19, 1959
4 Sheets-Sheet 4
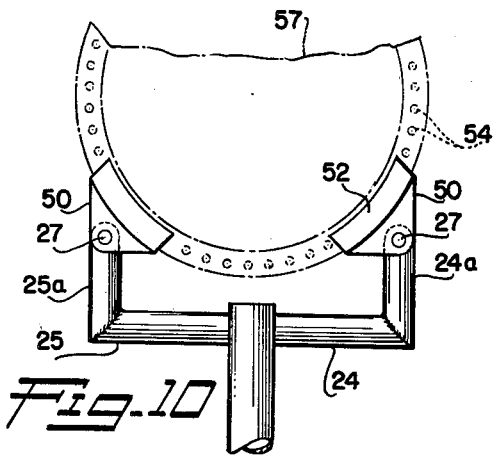
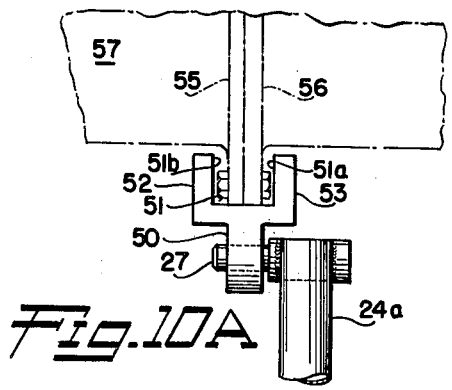
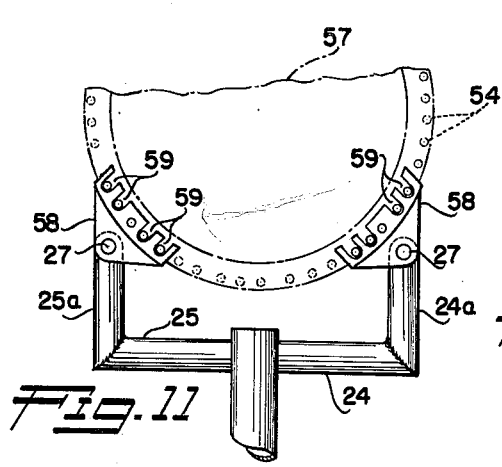
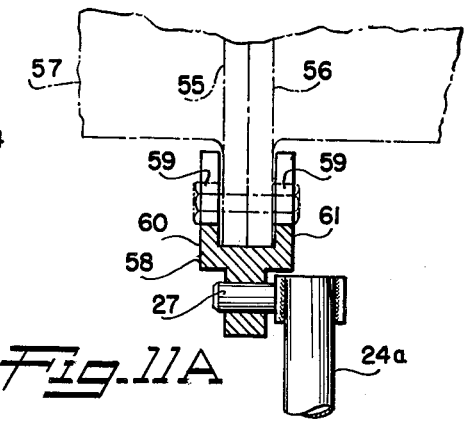
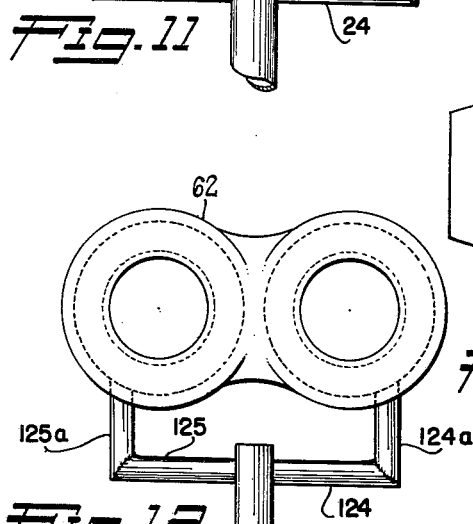
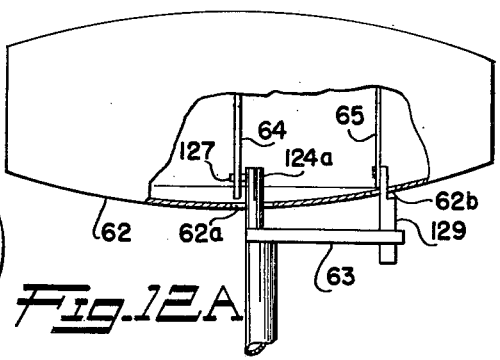
INVENTOR.
LEON D. GAVETTE
BY
George A. Sullivan
Agent United States Patent Office 3,085,798
Patented Apr. 16, 1963

3,085,798
MULTI-PURPOSE POWERPLANT STAND
Leon D. Gavette, Burbank, Calif., assignor to Lockheed Aircraft Corporation, Burbank, Calif.
Filed Feb. 19, 1959, Ser. No. 794,447
12 Claims. (Cl. 269—17)

This invention relates to a multi-purpose powerplant or engine stand, and more particularly to a stand that can (1) inclinate an engine in any direction relative to horizontal while servicing the engine or while removing or installing the powerplant relative to an aircraft, (2) serve as a powerplant ground transport dolly with adjustable or variable wheel tread, and (3) be easily foldably compacted with a powerplant mounted thereon as a small volume shipping support stand.

While there are known prior art devices capable of performing some of the functions accomplished by this invention, none have the flexibility or adaptability to serve the multiple purpose capabilities or flexibility of handling several different models of powerplants or powerplants of different manufacturers, all of which are attainable in the unitary device of this invention. For example, stands are known that will elevate engines while maintaining rigid support and allow longitudinal inclination of the engine and/or rotation about the axis thereof; however, such lack tread adjustability for rolling an engine mounted thereon through narrow spaces limited only by the overall diameter of the engine, or collapsibility with an engine mounted thereon into a compact engine shipping or storage stand utilizing a small volume of space, as well as also being able to handle more than one specific engine model. Additionally, it is necessary with prior art devices to use one type of stand for working on the engine and another special stand to install or remove an engine or powerplant relative to aircraft. Even then, few, if any, of such stands are adaptable or flexible sufficient to handle engines of different manufacturers or different engine models of the same manufacturer.

Accordingly, it is an object of this invention to provide a powerplant stand permitting unlimited directional movement of a powerplant when mounted thereon.

A further object of this invention is to provide a powerplant stand having unlimited directional movement relative to the horizontal of a powerplant mounted thereon at any powerplant height relative to the base of the stand.

A still further object of this invention is to provide a powerplant stand having a variable base wheel tread as well as to provide unlimited directional movement relative to the horizontal of a powerplant mounted thereon.

It is a still further object of this invention to provide a powerplant stand of simple device while embodying provision to accomplish all of the movements of a powerplant which are needed for the numerous powerplant handling and installation operations, as well as to provide unlimited access to the powerplant at all times while mounted on the stand.

Another object of this invention is to provide a powerplant stand which is of light weight, low cost and knockdown or collapsible simple construction, while embodying a variety of useful features combined into one powerplant stand.

It is still another object of this invention to provide a powerplant stand embodying all of the above features with adaptability or flexibility to function with a variety of different powerplant models, or powerplants of various manufacturers of comparatively the same size.

Other objects and advantages will become apparent from the following description taken in connection with the accompanying drawings in which:

FIGURE 1 is a perspective view of one embodiment of the powerplant stand of this invention with a turbo-jet engine mounted thereon;

FIGURE 2 is a partial plan view of the engine stand of FIGURE 1 with the powerplant shown in FIGURE 1 removed therefrom;

FIGURE 3 is a partial vertical view of the powerplant stand as shown in FIGURE 1;

FIGURE 4 is a partial vertical view of the powerplant stand as shown in FIGURE 1 and is similar to the view in FIGURE 3 but taken on a plane 90° to that in FIGURE 3;

FIGURE 5 is a partial cross-sectional view showing the details of the cylinder assembly members and hydraulic ram of the powerplant stand of this invention as shown in FIGURE 1;

FIGURE 6 is a view taken along line 6—6 in FIGURE 4;

FIGURE 7 is a partial cross-sectional view showing details of securing the engine support yoke to the support tube assembly of the powerplant stand as shown in FIGURE 1, the plane of FIGURE 7 being substantially the same and parallel to that of FIGURE 4;

FIGURE 8 is a view taken along line 8—8 of FIGURE 4;

FIGURE 9 is a view taken along line 9—9 of FIGURE 5;

FIGURES 10 and 10A depict an adapter for holding an engine on the powerplant stand of this invention that does not have the firewall or flange as shown on the powerplant mounted on the stand in FIGURE 1;

FIGURES 11 and 11A depict a modification of the adapters of FIGURES 10 and 10A wherein the engine can be secured or fastened to the engine yoke of the powerplant stand of this invention; and FIGURES 12 and 12A depict a yoke modification of the powerplant stand as shown in FIGURE 1 wherein the stand of this invention can accommodate a pair of engines in a pod arrangement.

Generally stated, this invention comprises a plurality of leg assemblies extending from a central tube or cylinder assembly, the leg assemblies secured to the central cylinder assembly in such a manner that each leg assembly can be independently pivoted or swiveled therearound to be repositioned and locked whereby the tread of wheels on the leg assemblies is variable. An engine or powerplant support yoke is secured or mounted to the upper portion of the central cylinder assembly in a manner whereby when an engine or powerplant is placed on the yoke it can be inclinated in any direction relative to horizontal through swiveling of the yoke assembly relative to the central cylinder assembly. The central tube or cylinder assembly has a hydraulic ram or cylinder therein permitting a variable vertical distance between the leg assemblies and the support yoke.

Referring more specifically to FIGURES 1, 2, 3 and 4, the stand assembly 1 comprises a central tube or cylinder assembly 2 having a plurality of leg assemblies 3 extending radially therefrom. A yoke assembly 4 is secured to the upper portion of cylinder assembly 2, and to which a powerplant 5 is connected thereto when mounted on stand assembly 1.

The cylinder assembly 2, as shown in FIGURES 1 through 5, and more specifically in FIGURE 5, comprises a base tube member 6 telescoping with an upper or support tube assembly 7. Support tube assembly 7 comprises an inner tube member 7a and outer tube member 7b, both of which are secured, as by welding, to an end cap 7c by welds 7d in such a manner whereby the tube members 7a and 7b are coaxial for substantially the entire axial length of outer tube member 7b. The upper portion of base tube 6 is located within the annular spacing between inner and outer support tube assembly members 7a and 7b, base tube 6 and support tube assembly 7 being connected together by a hydraulic ram or actuator 8 which has one end fastened or connected to cap 7c of support tube assembly 7, as by a cotter pin 8a, the other end of hydraulic ram 8 fastened or connected to the bottom of base tube 6, as by a nut and bolt fastening means 9. A hydraulic line 10 connects hydraulic ram 8 to a source of hydraulic fluid pressure (which will be explained in more detail hereinafter), so that when hydraulic fluid is pumped into hydraulic ram 8, there is a relative axial movement between base tube 6 and support tube assembly 7, or in other words, the support tube assembly 7 becomes elevated while base tube 6 remains stationary.

Each leg assembly 3 comprises a pair of tubular members 11 and 12 secured together at their farthest removed ends from cylinder assembly 2 by welds 13. Adjacent each weld 13 is a plate 14 having roller caster wheels 15 secured thereto. Also included are caster locks 16 which provide for the locking of casters 15 when it is desired that the stand assembly 1 be stationary, it being understood that other types of wheels may be used as well as the caster locks may be dispensed with without departing from the scope of this invention.

The leg assemblies 3 are fastened to cylinder assembly 2 by connection of tubular members 11 to a lower plate member 17 welded or secured to base tube 6 around the outer periphery thereof. Tubular members 12, each of which have a plate member 12a on the upper ends thereof, are connected to an upper plate member 18 that is welded or secured to base tube 6 in a similar manner as lower plate 17. Gusset plates 19 are provided to both upper and lower plates 17 and 18, and the base tube 6 to impart structural rigidity to plates 17 and 18.

Each connection of tubular members 11 and 12 to plates 17 and 18 respectively is accomplished by a pair of fastening means 20 and 21, as can best be seen in FIGURES 4 and 6. The fastening means 20 serve as pivots for the leg assemblies to swing around relative to cylinder assembly 2 when fastening means 21 are removed. Thus, by providing a plurality of openings or holes 22 in both plates 17 and 18, a variable tread between leg assemblies 3 can be accomplished by removing the fastening means 21 from tubular members 11 and 12 and plates 17 and 18, and thereafter rotating the leg assemblies 3 around fastening means 20 until a new hole 22 is in alignment for fastening means 21 to pass therethrough. As shown on the right hand side of FIGURE 6, as tubular element 12 is rotated counterclockwise from a position indicated by solid lines to a position 12b as indicated by phantom lines, the member may then be secured in this new position by passing the fastening means through the next adjacent hole 22 in plate 18. Upon a likewise relocation of all leg assemblies 3, it can be seen that the casters 15 on two adjacent leg assemblies 3 are moved towards each other, while the other two leg assemblies 3 are likewise moved toward each other and thus in turn resulting in a reduction of the tread between each caster 15 and one of its adjacent casters. It is of course to be realized that this adds to the flexibility of stand assembly 1 in that when moving the stand assembly 1 through a doorway from one location to another with an engine mounted thereon, the width of the doorway or a passageway need only be limited by the overall diameter of the engine itself, while on the other hand, once the stand mounted engine is beyond the doorway or out of a passageway, the distance or tread between casters 15 can be increased to the maximum for utmost stability.

Hydraulic fluid is supplied through line 10 to ram 8 by a hydraulic hand pump 3a mounted on member 11 of one of the leg assemblies 3. Pump 3a can be any of a variety of the types available commercially, the details of which do not form any limitations to this invention, and is merely indicative of the preferred means to extend or elevate support tube assembly 7 relative to base tube 6.

Also, the hydraulic pump 3a may be placed at any convenient location on the stand.

Referring to FIGURES 1, 2, 3 and 4, the yoke or engine support assembly 4 comprises a main tubular member 23 having tubular members 24 and 25 secured at one end thereof in a bifurcating arrangement. The tubular members 24 and 25 have an intermediate portion cut out and the ends are bent upwardly 90 degrees to form upright portions 24a and 25a, the members 24 and 24a and 25 and 25a becoming rigid members by being welded together around the cutout seam as indicated by weld 26. Mounted at the upper end of each of portions 24a and 25a is a pin 27, the purpose of which will be described in more detail hereinafter.

At the other end of tubular member 23 is secured another tubular member 28 having an angulated relationship relative to member 23. A plate 29 is secured to the end of member 28, with support rigidity added thereto by gusset plates 30 secured by welding to both tubular member 28 and plate 29.

As can best be seen in FIGURES 2, 4 and 7, the yoke or engine support assembly 4 is swingably or pivotally attached to the support tube assembly by virtue of a spherical fitting 31 threaded into a plug means 32 in the end of tubular member 23; the spherical fitting 31 being connected with a pair of tabs 33 extending radially outward from the outer surface of outer tube member 7b by a pin 34.

To maintain tubular member 23 of yoke assembly 4 in a predetermined position in a vertical plane, a rectangular channel member 35 is secured to outer tube member 7b of support tube assembly 7 so as to extend substantially parallel to tubular member 23. A jackscrew 36 is threadingly engaged in a threaded tube 37 connected to and extending radially from tubular member 23 in such a manner that as jackscrew 36 is threaded out of tube 37, yoke assembly 4 pivots in a counterclockwise direction as seen in FIGURE 4 about pin 34 because of the foot of jackscrew 36 bearing on channel member 35.

To cause yoke assembly 4 to rotate around pin 34 in a clockwise direction as viewed in FIGURE 4, a strap 38 encircling tubular member 23 (as can best be seen in FIGURES 2, 4 and 8) is connected to an eye-bolt 39 by a pin 40, the eye-bolt passing through a tube 41 secured to rectangular channel 35 and having a hand nut means 42 on the threaded portion of eye-bolt 39 in abutment with the bottom portion of tube 41 extending below the lower surface of rectangular channel 35. Thus, as hand nut 42 is rotated to move away from the threaded end of eye-bolt 39 and bears on the adjacent end of tube 41, the yoke assembly 4 will be rotated in a clockwise direction as seen in FIGURE 4 around pin 34 through the interconnection of eye-bolt 39 to tubular member 23 of yoke assembly 4. Hence, it can easily be seen that rotation of hand nut 42 to advance toward the threaded end of eye-bolt 39 and rotation of jackscrew 36 to withdraw from threaded tube 37 will cause the yoke assembly 4 to rotate around pin 34 in a counterclockwise direction as viewed in FIGURE 4, while rotation of hand nut 42 and jackscrew 36 in the opposite direction will cause the yoke assembly 4 to rotate in a clockwise direction.

To assure rotation of tubular member 23 in a vertical plane by control of jackscrew 36 and hand nut 42 on eye-bolt 39, a pair of angle members 43 are connected to opposite sides of rectangular channel 35 to provide a slot or channel 44 for tubular member 23 to slide or ride in as yoke assembly 4 is pivoted or rotated around pin 34.

In order to accomplish rotation of yoke assembly 4 around an axis of rotation coaxial with tubular member 23, there is provided a pair of I members 45 secured to outer tube member 7b of support tube assembly 7 disposed on opposite sides of rectangular channel 35, as can best be seen in FIGURES 1, 2, 3 and 4. A jackscrew 46 is threadingly engaged with a threaded tube 47 between each of the I members 45 and tubular members 24 and 25 of yoke assembly 4, and which operate in a similar manner to jackscrew 36 and threaded tube 37 explained hereinabove. Referring specifically to FIGURE 3, retraction of the jackscrew 46 from tube 47 appearing on the right hand side of the drawing in conjunction with screwing jackscrew 46 into threaded tube 47 appearing on the left hand side of the drawing, it can be seen the yoke assembly 4 will rotate in a counterclockwise direction so as to place members 24, 24a, 25 and 25a into the phantomed positions 24b, 24c, 25b and 25c respectively. Operation of jackscrews 46 in directions opposite than that indicated above will rotate members 24, 24a, 25 and 25a of yoke assembly 4 in a clockwise direction to phantomed positions 24d, 24e, 25d and 25e respectively.

It is to be understood that by compound action of jackscrews 46 with jackscrew 36 and hand nut 42, the yoke or engine support assembly 4 can be tilted or inclinated in any direction relative to the horizontal.

Referring now to FIGURES 5 and 9, there is also provided a means to prevent rotation of the engine support assembly 4 in a horizontal plane relative to the leg assemblies 3. When hydraulic ram 8 is retracted, this means comprises a plurality of semi-circular cutouts 48 around the bottom edge of inner tube member 7a which will seat on the shank of fastening means 9 when hydraulic ram 8 is fully retracted. The weight of support tube assembly 7, yoke assembly 4 and powerplant 5 (if mounted on the stand) will then prevent relative coaxial rotation between inner tube member 7a and base tube 6.

Likewise, there are a plurality of semi-circular cutouts 49 in the upper end of base tube 6 similar to cutouts 48 in inner tube member 7a through which any type of lock pin means (not shown) can be placed into and passed through openings 50 in the wall of base tube 6. This provides a means for preventing relative rotation between inner tube member 7a of support tube assembly 7 and base tube 6 when hydraulic ram 8 is extended, as well as providing a safety lock means to maintain the yoke or engine support assembly 4 in an elevated position should hydraulic ram 8 fail or the hydraulic pressure in ram 8 be released.

The embodiment of the invention as described thus far encompasses use for a powerplant 5 having a flange type firewall 5a secured around a flange thereon and having openings for pins 27 of yoke assembly 4. The engine is mounted on yoke assembly 4 by passing the pins 27 through properly located openings in firewall 5a and plate 29 is thereafter secured to or placed in abutment with an aft flange 5b of powerplant 5. If desired, some of the engine bolts located in flange 5b may be removed and then reinstalled so as to pass through the openings in flange 5b and openings 29a in plate 29, thereby fastening the engine to yoke assembly 4. It is to be realized that if on the other hand it is only desired to place the engine on the yoke assembly 4, such may be accomplished by passing pins 27 through the properly located openings in flange or firewall 5a and allowing the aft portion of the engine to rest on plate 29; it also being understood in this situation that it is necessary for the center of gravity of powerplant 5 to be located between flanges 5a and 5b. With a powerplant 5 mounted thereon, such may be raised or lowered by hydraulic pump 3a extending hydraulic ram 8, as well as the powerplant 5 may be rotated in a horizontal plane relative to leg assembly 3 and may be tilted in any direction with respect to the horizontal by the proper adjustment of jackscrews 36, 46 and hand nut 42 in the proper combinations thereof.

Likewise, should a powerplant 5 be mounted on stand assembly 1 which is to be rolled through a doorway or passageway narrower than the tread between caster wheels 15 of leg assemblies 3, the fastening means 21 between tubular members 11 and 12 of leg assemblies 3 and plates 17 and 18 respectively may be removed whereupon each of the leg assemblies 3 may be rotated relative to plates 17 and 18 about the center of fastening means 20 until the openings or holes in tubular members 11 and 12 closest to central tube assembly 2 are in alignment with another of the openings or holes 22 in plates 17 and 18. Fastening means 21 can be reinserted and thereby prevent further rotation of leg assemblies 3 relative to central tube assembly 2. This variable tread feature also serves to permit stand assembly 1 to serve as a shipping stand of low volume by retracting ram 8 and reducing the wheel tread to a dimension less than the overall diameter of the engine thereon. Thus, when the stand is used functionally in this manner, the engine does not have to be removed from a stand and placed in a shipping container only to be removed from the shipping container and remounted on a stand after arrival or upon being placed into use at the destination. Instead, the stand assembly 1 is merely collapsed to substantially its smallest volume and shipped or transported with the engine thereon.

In order to accommodate powerplants 5 that do not have firewall structure 5a, there is provided a pair of adapters 50 as shown in FIGURES 10 and 10a. The adapters 50 provide an arcuate segmented channel 51, the opposing walls 51a and 51b of which are formed by the opposing surfaces of bifurcate members 52 and 53. The width of channel 51 is greater than the overall axial length of the bolt and nut assemblies 54 securing together flanges 55 and 56 on powerplant 57. With a portion of the flanges 55 and 56 of powerplant 57 located within channels 51 of adapters 50, the aft flange or portion of the powerplant may be placed to abut against or connected to plate 29 of yoke assembly 4.

It is realized that use of adapters 50 merely provides for the setting of the engine on stand assembly 1 and does not provide for securing the engine thereto to the same extent as is provided by pins 27 passing through properly positioned openings in a firewall. Thus, should it be desired to fasten the powerplant 57 to the foremost members of yoke assembly 4, then adapters 58 as shown in FIGURES 11 and 11a may be utilized. This embodiment provides a plurality of cutouts 59 cut into both bifurcate sidewall members 60 and 61 of adapter 58 into which slide the nut and bolt heads of the fastening means passing through flanges 55 and 56 of powerplant 57. The fastening of adapters 58 to powerplant 57 is accomplished by omitting at least one slot 59 for the fastening means located circumferentially around the flanges of powerplant 57 and which thus requires, to fasten adapter 58 to powerplant 57, the removal of one of the fastening means and reinstalling such fastening means by passing the bolt shank through bifurcate sidewall members 60 and 61 of adapter 58 as well as the openings in flanges 55 and 56. With the powerplant 57 fastened to the foremost members of yoke assembly 4, the aft flange or portion of powerplant 57 may be placed in abutment with plates 29 of yoke assembly 4 or secured thereto as explained hereinbefore.

FIGURES 12 and 12a present a further modification of this invention to accommodate a multi-engine pod assembly 62. In this embodiment, a yoke assembly 63 includes members 124, 124a, 125 and 125a providing an increased span between a pair of pins 127 located near the upper extremities of members 124a and 125a; each of the pins 127 passing through a properly located opening in a firewall or flange 64 of each of the powerplants in the pod, members 124a and 125a passing through access doors or openings 62a in pod 62. Yoke assembly 63 further includes an upright extending member 129 for each engine in the pod assembly which passes through access doors or openings 62b in pod 62 and connects to a firewall or flange 65 by a pin type connection passing through a properly located opening or by a bolt and nut fastening means as hereinbefore explained.

Thus, it can be seen there is provided a new and novel multi-purpose powerplant stand permitting a powerplant mounted thereon to be raised and lowered relative to the ground as well as be inclinated in any direction to the horizontal. Furthermore, with the variable tread provisions of the leg assemblies a powerplant mounted on the stand of this invention can be moved from one shop or room to another with the only limiting factor of the width of the door or passageway being the diameter of the engine, as well as permits the use of the stand of this invention to be utilized as a substantially compact shipping device for a powerplant. With a powerplant mounted thereon, the hydraulic ram retracted and the leg assemblies rotated or positioned to provide a relatively narrow tread, there is provided a shipping device requiring slightly more space or volume than the usual type of shipping container and without requiring the use of crane facilities to transfer the engine to the shipping container from the stand or vice versa at the shipping or destination points.

While particular embodiments of this invention have been illustrated and described, it will be obvious to those skilled in the art that various changes and modifications may be made without departure from the invention and it is intended to cover in the appended claims all such modifications and equivalents as fall within the true spirit and scope of this invention.

What is claimed is:

1. A powerplant stand comprising an upper tube, a base tube, the upper tube and base tube telescoped together to form a central support, a plurality of leg assemblies, said leg assemblies secured to the base tube of said central support and extending in substantially horizontal directions therefrom, an engine yoke swivelly secured to the upper tube of the central support, a first means on said yoke for securing an engine in fixed relative position thereto, and second means coacting between the yoke and the upper tube of the central support for positioning and maintaining both the engine and the yoke in any position parallel as well as inclined to a substantially horizontal plane when an engine is mounted on the yoke.

2. A powerplant stand comprising an upper tube, a base tube, the upper tube and base tube telescoped together to form a central support, a hydraulic ram within said central support connected at one end to the upper tube and connected at the other end to the base tube, a plurality of leg assemblies, said leg assemblies secured to said base tube and extending in substantially horizontal directions therefrom, an engine yoke swivelly secured to the upper tube, a first means on said yoke for securing an engine in fixed relative position thereto, a second means coacting between the yoke and upper tube for positioning and maintaining both the yoke and an engine in any position parallel as well as inclined to a substantially horizontal plane when mounted on the yoke, a hydraulic hand pump mounted on the stand and connected to the ram by a hydraulic line whereby the yoke and upper tube may be elevated relative to the base tube and leg assemblies, and lock means for prevention of relative rotation between the upper tube and base tube.

3. A powerplant stand comprising an upper tube, a base tube, the upper tube and base tube telescoped together to form a central support, a hydraulic ram within said central support connected at one end to the upper tube and connected at the other end to the base tube, a plurality of leg assemblies, said leg assemblies connected to said base tube and extending in subtantially horizontal directions therefrom, said connection between each leg assembly and the base tube pivotal about a substantially vertical axis whereby the tread between adjacent leg assemblies may be varied, an engine yoke swivelly secured to the upper tube, a first means on said yoke for securing an engine thereto, a second means coacting between the yoke and upper tube for positioning and maintaining an engine in any position parallel as well as inclined to a substantially horizontal plane when mounted on the yoke, and a hydraulic hand pump mounted on the stand and connected to the ram by a hydraulic line whereby the yoke and upper tube may be elevated relative to the base tube and leg assemblies.

4. A powerplant stand comprising: a vertical elongate central support; a plurality of leg assemblies, said leg assemblies secured to said central support and extending in substantially horizontal directions therefrom; an engine yoke swivelly secured to the central support; engine mounting means on said yoke including a pair of upright lateral-spaced members at the forward terminus thereof, a pin means secured at the end of each upright member, the pin axes normal to axes of the upright members, and a plate-like means having a plurality of openings therein at the rearward terminus of the yoke, said plate-like means supporting one end of a powerplant when both pin means have been inserted into properly aligned openings in a flange extending from a powerplant mounted thereon; and further means coacting between the yoke and the central support for positioning and maintaining both the yoke and an engine in any position parallel as well as inclined to a substantially horizontal plane when mounted on the yoke.

5. A powerplant stand comprising: a vertical elongate central support; a plurality of leg assemblies, said leg assemblies secured to said central support and extending in substantially horizontal directions therefrom; an engine yoke swivelly secured to the central support, said yoke having forward and aft engine mounting means interconnected by a main yoke member; a channel member fastened to the central support and extending horizontally therefrom substantially parallel to said main yoke member; and yoke fore and aft tilt control means including a jackscrew extending from the main yoke member to bear on said channel member which when extended from the main yoke member forces the yoke to rotate in one direction about the swivel connection to the central support, a rod having a threaded portion at one end and pivotally connected at the other end thereof to the main yoke member, said rod passing through an opening in the channel, and a hand nut means on said rod threaded portion which when advanced thereon forces the yoke to rotate in the opposite direction about the swivel connection to the central support; said tilt control means operable to position and maintain the yoke at any fore and aft inclination relative to the central support and leg assemblies.

6. A powerplant stand comprising: a vertical elongate central support; a plurality of leg assemblies, said leg assemblies fastened to said central support and extending in substantially horizontal directions therefrom; an engine yoke swivelly secured to the central support, said yoke having a pair of forward members and an aft member interconnected by a main yoke member; engine mounting means adjacent the free end of said yoke assembly forward and aft members; a channel member secured to the central support and extending horizontally therefrom substantially parallel to said main yoke member; yoke fore and aft tilt control means including a jackscrew extending from the main yoke member to bear on said channel member which when extended from the main yoke member forces the yoke to rotate in one direction about the swivel connection to the central support, a rod having a threaded portion at one end pivotally connected at the other end thereof to the main yoke member, said rod passing through an opening in the channel, and a hand nut means on said rod threaded portion which when advanced thereon forces the yoke to rotate in the opposite direction about the swivel connection to the central support; a pair of second channel members secured to the central support and extending substantially horizontally therefrom; and yoke lateral tilt control means including a jackscrew extending from each of the forward yoke members to bear on one of said second channel members, said jackscrews and second channel members cooperating whereby extension of one jackscrew from its forward yoke member forces the yoke assembly to rotate laterally about the swivel connection to the central support, said yoke assembly rotating laterally in the opposite direction as the other jackscrew is extended from its forward yoke member; said fore and aft and lateral tilt control means operable to position and maintain the yoke at any angle of inclination relative to the horizontal and central support and leg assemblies.

7. A powerplant stand comprising: an upper tube; a base tube, the upper tube and base tube telescoped together to form a central support; a hydraulic ram within said central support connected at one end to the upper tube and connected at the other end to the base tube; a plurality of leg assemblies, said leg assemblies fastened to said base tube and extending in substantially horizontal directions therefrom; an engine yoke swivelly secured to the central support, said yoke having forward and aft engine mounting means interconnected by a main yoke member; a channel member secured to the central support and extending horizontally therefrom substantially parallel to said main yoke member; yoke fore and aft tilt control means including a jackscrew extending from the main yoke member to bear on said channel member which when extended from the main yoke member forces the yoke to rotate in one direction about the swivel connection to the central support, a rod having a threaded portion at one end pivotally connected at the other end thereof to the main yoke member, said rod passing through an opening in the channel, and a hand nut means on said rod threaded portion which when advanced thereon forces the yoke to rotate in the opposite direction about the swivel connection to the central support; said fore and aft tilt control means operable to position and maintain the yoke at any fore and aft inclination relative to the central support and leg assemblies; and a hydraulic hand pump mounted on the stand and connected to the ram by a hydraulic line whereby the yoke and upper tube may be elevated relative to the base tube and leg assemblies.

8. A powerplant stand comprising: a vertical elongate central support; a plurality of leg assemblies, said leg assemblies fastened to said central support and extending in substantially horizontal directions therefrom, said connection between each leg assembly and the central support pivotal about a substantially vertical axis whereby the tread between adjacent leg assemblies may be varied; an engine yoke swivelly secured to the central support, said yoke having forward and aft engine mounting means interconnected by a main yoke member; a channel member secured to the central support and extending horizontally therefrom substantially parallel to said main yoke member; and yoke fore and aft tilt control means including a jackscrew extending from the main yoke member to bear on said channel member which when extended from the main yoke member forces the yoke to rotate in one direction about the swivel connection to the central support, a rod having a threaded portion at one end pivotally connected at the other end thereof to the main yoke member, said rod passing through an opening in the channel, and a hand nut means on said rod threaded portion which when advanced thereon forces the yoke to rotate in the opposite direction about the swivel connection to the central support; said tilt control means operable to position and maintain the yoke at any fore and aft inclination relative to the central support and leg assemblies.

9. A powerplant stand comprising: an upper tube; a base tube, the upper tube and base tube telescoped together to form a central support; a hydraulic ram within said central support connected at one end to the upper tube and connected at the other end to the base tube; a plurality of leg assemblies, said leg assemblies fastened to said base tube and extending in substantially horizontal directions therefrom, said connection between each leg assembly and the base tube pivotal about a substantially vertical axis whereby the tread between adjacent leg assemblies may be varied; an engine yoke swivelly secured to the upper tube, said yoke having forward and aft engine mounting means interconnected by a main yoke member; a channel member secured to the upper tube and extending horizontally therefrom substantially parallel to said main yoke member; a yoke fore and aft tilt control means including a jackscrew extending from the main yoke member to bear on said channel member which when extended from the main yoke member forces the yoke to rotate in one direction about the swivel connection to the upper tube, a rod having a threaded portion at one end pivotally connected at the other end thereof to the main yoke member, said rod passing through an opening in the channel, and a hand nut means on said rod threaded portion which when advanced thereon forces the yoke to rotate in the opposite direction about the swivel connection to the upper tube; said fore and aft tilt control means operable to position and maintain the yoke at any fore and aft inclination relative to the central support and leg assemblies; and a hydraulic hand pump mounted on the stand and connected to the ram by a hydraulic line whereby the yoke and upper tube may be elevated relative to the base tube and leg assemblies.

10. A powerplant stand comprising: an upper tube; a base tube, the upper tube and base tube telescoped together to form a central support; a hydraulic ram within said central support connected at one end to the upper tube and connected at the other end to the base tube; a plurality of leg assemblies, said leg assemblies connected to said central support and extending in substantially horizontal directions therefrom; an engine yoke swivelly secured to the upper tube, said yoke having a pair of forward members and an aft member interconnected by a main yoke member; engine mounting means adjacent the free end of said yoke assembly forward and aft members; a channel member secured to the upper tube and extending horizontally therefrom substantially parallel to said main yoke member; a yoke fore and aft tilt control means including a jackscrew extending from the main yoke member to bear on said channel member which when extended from the main yoke member forces the yoke to rotate in one direction about the swivel connection to the upper tube, a rod having a threaded portion at one end pivotally connected at the other end thereof to the main yoke member, said rod passing through an opening in the channel, and a hand nut means on said rod threaded portion which when advanced thereon forces the yoke to rotate in the opposite direction about the swivel connection to the upper tube; a pair of second channel members secured to the upper tube and extending substantially horizontally therefrom; a yoke lateral tilt control means including a jackscrew extending from each of the forward yoke members to bear on one of said second channel members, said jackscrews and second channel members cooperating whereby extension of one jackscrew from its forward yoke member forces the yoke assembly to rotate laterally about the swivel connection to the upper tube, said yoke assembly rotating laterally in the opposite direction as the other jackscrew is extended from its forward yoke member; said fore and aft and lateral tilt control means operable to position and maintain the yoke at any angle of inclination relative to the horizontal with respect to the central support and leg assemblies; and a hydraulic hand pump mounted on the stand and connected to the ram by a hydraulic line whereby the yoke and upper tube may be elevated relative to the base tube and leg assemblies.

11. A powerplant stand comprising: a vertical elongate central support; a plurality of leg assemblies, said leg assemblies connected to said central support and extending in substantially horizontal directions therefrom, said connection between each leg assembly and the central support pivotal about a substantially vertical axis whereby the tread between adjacent leg assemblies may be varied; an engine yoke swively secured to the central support, said yoke having a pair of forward members and an aft member interconnected by a main yoke member; engine mounting means adjacent the free end of said yoke assembly forward and aft members; a channel member secured to the central support and extending horizontally therefrom substantially parallel to said main yoke member; a yoke fore and aft tilt control means including a jackscrew extending from the main yoke member to bear on said channel member which when extended from the main yoke member forces the yoke to rotate in one direction about the swivel connection to the central support, a rod having a threaded portion at one end pivotally connected at the other end thereof to the main yoke member, said rod passing through an opening in the channel, and a hand nut means on said rod threaded portion which when advanced thereon forces the yoke to rotate in the opposite direction about the swivel connection to the central support; a pair of second channel members secured to the central support and extending horizontally therefrom; and yoke lateral tilt control means including a jackscrew extending from each of the forward yoke members to bear on one of said second channel members, said jackscrews and second channel members cooperating whereby extension of one jackscrew from its forward yoke member forces the yoke assembly to rotate laterally about the swivel connection to the central support, said yoke assembly rotating laterally in the opposite direction as the other jackscrew is extended from its forward yoke member; said fore and aft and lateral tilt control means operable to position and maintain the yoke at any angle of inclination relative to the horizontal with respect to the central support and leg assemblies.

12. A powerplant stand comprising: an upper tube; a base tube, the upper tube and base tube telescoped together to form a central support; a hydraulic ram within said central support connected at one end to the upper tube and connected at the other end to the base tube; a plurality of leg assemblies, said leg assemblies connected to said base tube and extending in substantially horizontal directions therefrom, said connection between each leg assembly and base tube pivotal about a substantially vertical axis whereby the tread between adjacent leg assemblies may be varied; an engine yoke swively fastened to the upper tube, said yoke having a pair of forward members and an aft member interconnected by a main yoke member; engine mounting means adjacent the free end of said yoke assembly forward and aft members; a channel member secured to the upper tube and extending horizontally therefrom substantially parallel to said main yoke member; a yoke fore and aft tilt control means including a jackscrew extending from the main yoke member to bear on said channel member which when extended from the main yoke member forces the yoke to rotate in one direction about the swivel connection to the upper tube, a rod having a threaded portion at one end pivotally connected at the other end thereof to the main yoke member, said rod passing through an opening in the channel, and a hand nut means on said rod threaded portion which when advanced thereon forces the yoke to rotate in the opposite direction about the swivel connection to the upper tube; a pair of second channel members secured to the upper tube and extending horizontally therefrom; a yoke lateral tilt control means including a jackscrew extending from each of the forward yoke members to bear on one of said second channel members, said jackscrews and second channel members cooperating whereby extension of one jackscrew from its forward yoke member forces the yoke assembly to rotate laterally about the swivel connection to the upper tube, said yoke assembly rotating laterally in the opposite direction as the other jackscrew is extended from its forward yoke member; said fore and aft and lateral tilt control means operable to position and maintain the yoke at any angle of inclination relative to the horizontal with respect to the central support and leg assemblies; and a hydraulic hand pump mounted on the stand and connected to the ram by a hydraulic line whereby the yoke and upper tube may be elevated relative to the base tube and leg assemblies.

References Cited in the file of this patent

UNITED STATES PATENTS

| | | |
|---|---|---|
| 135,771 | Burtch | Feb. 11, 1873 |
| 198,523 | Slemmons | Dec. 25, 1877 |
| 520,319 | Kynoch | May 22, 1894 |
| 525,298 | Thiele et al. | Aug. 28, 1894 |
| 2,106,525 | Henry | Jan. 25, 1938 |
| 2,188,433 | Friese | Jan. 30, 1940 |
| 2,189,010 | Lewis | Feb. 6, 1940 |
| 2,523,734 | Stephenson et al. | Sept. 26, 1950 |
| 2,803,872 | Massa | Aug. 27, 1957 |
| 2,814,099 | Knittel | Nov. 26, 1957 |
| 2,820,644 | Smith | Jan. 21, 1958 |
| 2,825,477 | Ross | Mar. 4, 1958 |
| 2,838,278 | Johnsen | June 10, 1958 |
| 2,904,331 | Olson | Sept. 15, 1959 |